United States Patent [19]

Richardson et al.

[11] Patent Number: 5,739,852
[45] Date of Patent: Apr. 14, 1998

[54] ELECTRONIC IMAGING SYSTEM AND SENSOR FOR USE THEREFOR WITH A NONLINEAR DISTRIBUTION OF IMAGING ELEMENTS

[75] Inventors: Charles Patrick Richardson, Barrington; Bruce Edward Stuckman, Algonquin, both of Ill.

[73] Assignee: Motorola Inc., Schaumburg, Ill.

[21] Appl. No.: 512,876

[22] Filed: Aug. 9, 1995

Related U.S. Application Data

[63] Continuation of Ser. No. 352,307, Dec. 8, 1994, Pat. No. 5,489,940.

[51] Int. Cl.$^6$ .................................................. H04N 3/14
[52] U.S. Cl. .................................... 348/315; 348/335
[58] Field of Search ................................ 348/335, 340, 348/294, 311, 315, 91, 342; 257/231

[56] References Cited

U.S. PATENT DOCUMENTS

| | | | |
|---|---|---|---|
| 4,204,230 | 5/1980 | Sprague | 358/213 |
| 4,240,727 | 12/1980 | Lermann et al. | 354/25 |
| 4,549,208 | 10/1985 | Kamejima et al. | 358/108 |
| 4,554,585 | 11/1985 | Carlson | 358/209 |
| 4,574,311 | 3/1986 | Resnikoff et al. | 358/213 |
| 4,602,289 | 7/1986 | Sekine | 358/213 |
| 4,720,746 | 1/1988 | Moore | 358/213.28 |
| 4,740,839 | 4/1988 | Phillips | 358/108 |
| 4,752,831 | 6/1988 | Biber et al. | 358/227 |
| 4,757,384 | 7/1988 | Nonweiler et al. | 358/160 |
| 4,928,174 | 5/1990 | Smith | 358/108 |
| 5,067,019 | 11/1991 | Juday et al. | 358/160 |
| 5,068,735 | 11/1991 | Tuchiya et al. | 358/209 |
| 5,185,667 | 2/1993 | Zimmerman | 358/209 |
| 5,200,818 | 4/1993 | Neta et al. | 358/87 |
| 5,276,519 | 1/1994 | Richards et al. | 358/209 |
| 5,313,306 | 5/1994 | Kuban et al. | 348/65 |
| 5,359,363 | 10/1994 | Kuban et al. | 348/36 |
| 5,489,940 | 2/1996 | Richardson et al. | 348/315 |

*Primary Examiner*—Wendy Garber
*Attorney, Agent, or Firm*—Bruce E. Stuckman; Jeffrey G. Toler

[57] ABSTRACT

An electronic imaging system for capturing an image comprising a lens and an imaging sensor. The lens produces an optical image. The imaging sensor has a surface in optical communication with the lens, for converting the optical image into a corresponding output signal. The imaging sensor includes a plurality of imaging elements, the plurality of imaging elements having a distribution on the surface representable by a nonlinear function. The distribution of imaging elements has a relatively low density at a center point of the surface and a relatively high density at a point along a periphery of the surface.

23 Claims, 3 Drawing Sheets

ELECTRONIC IMAGING SYSTEM AND SENSOR FOR USE THEREFOR WITH A NONLINEAR DISTRIBUTION OF IMAGING ELEMENTS

This is a continuation of application Ser. No. 08/352,307, filed on 8 Dec. 1994, now U.S. Pat. No. 5,489,940.

RELATED INVENTION

The present invention is related to the following invention which is assigned to the same assignee as the present invention:

(1) "Method for Creating Image Data" having Ser. No. 08/303,927, filed Sep. 9, 1994.

The subject matter of the above-identified related invention is hereby incorporated by reference into the disclosure of this invention.

1. Technical Field

The present invention relates generally to imaging systems and, in particular, to an imaging system for capturing wide-angle images.

2. Background of the Invention

Traditional cameras provide photographs with a limited field of view of a particular scene being photographed. Take for example the famous Zapruder film of the assassination of President John F. Kennedy. The sequence of frames of the movie show only the car and its occupants. If the movie had recorded a visual image of the entire scene, many issues, such as, whether or not all of the shots originated from the book depository building, could possibly be resolved. It is thus desirable to provide a camera with a wider field of view.

One recently introduced camera creates a panorama photograph using a multi-segment lens and a plurality of film frames. The panorama image is captured as a plurality of individual image segments which are concatenated in the developing process to produce a single photograph. The development of these panorama photographs requires a complicated process so that the individual segments are properly aligned with one another such that no gaps or overlaps occur. Further, this camera and processing method do not provide for electronic accessing of the completed photo.

An additional prior art system, developed by TeleRobotics International Inc., captures a 180 degree image using a fish-eye or hemispheric lens. A CCD camera captures image data from the lens and the image data is processed to "flatten it out". After this image data has been transformed, it can be accessed electronically. A user can zoom into a particular portion of the image and view only that portion in an expanded format. While this system is very powerful and has many advantages, the camera requires complex circuitry for implementing a mathematical transformation.

A need exists for a relatively inexpensive camera system which captures a wide field of view image and allows the user to electronically access and examine only selected portions of the captured image without the need of complex transformation circuitry.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

Figure 1:
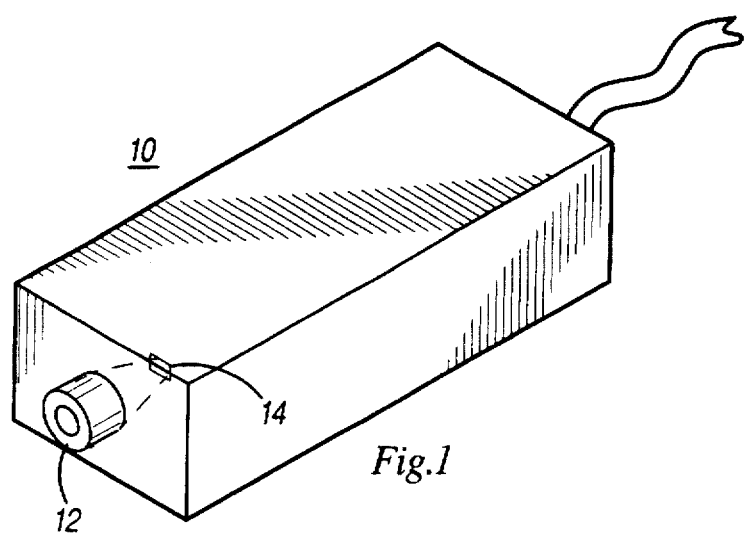
FIG. 1 shows a pictorial diagram of a camera used in conjunction with one embodiment of the present invention.

FIG. 1 shows a pictorial diagram of a camera used in conjunction with one embodiment of the present invention. Camera 10 includes a wide-angle lens 12 which projects an wide field-of-view image of the scene in front of camera 10 onto an imaging sensor 14. This sensor 14 includes an array of individual imaging elements which are nonlinearly distributed in such a fashion as to automatically correct for the distortion induced by the wide-angle lens 12.

Figure 2:
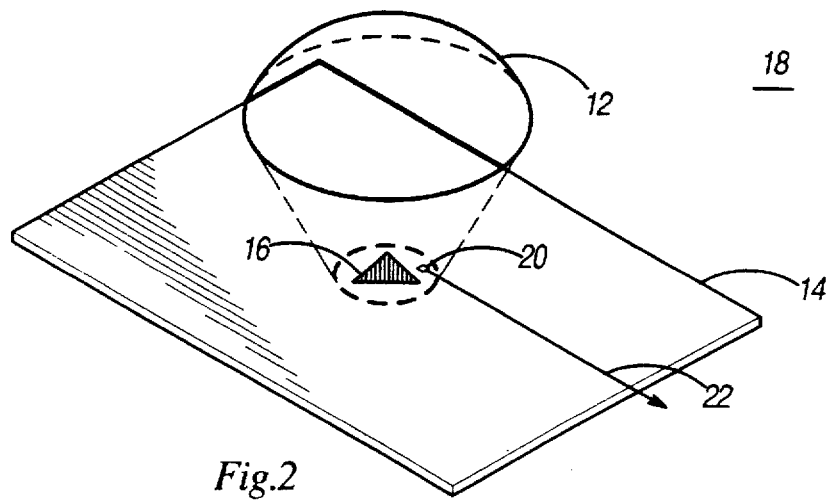
FIG. 2 presents a schematic representation of one embodiment of the present invention.

FIG. 2 presents a schematic representation of one embodiment of the present invention. A sensor 14 is provided for use in an electronic imaging system having a wide-angle lens 12 that produces a wide-angle optical image 16. This wide-angle image is distorted by the operation of the lens 12.

The sensor includes a surface 18 in optical communication with the wide-angle lens 12. The sensor further includes a plurality of imaging elements such as imaging element 20, coupled to the surface, for converting the wide-angle optical image into a corresponding output signal 22. The plurality of imaging elements have a distribution on the surface representable by a nonlinear function, wherein the distribution of the imaging elements corrects the distortion in the wide-angle image. Therefore, the output signal 22 corresponds to a distortion-corrected wide-angle image—eliminating the need for the transformation circuitry required by the prior art.

Figure 3:
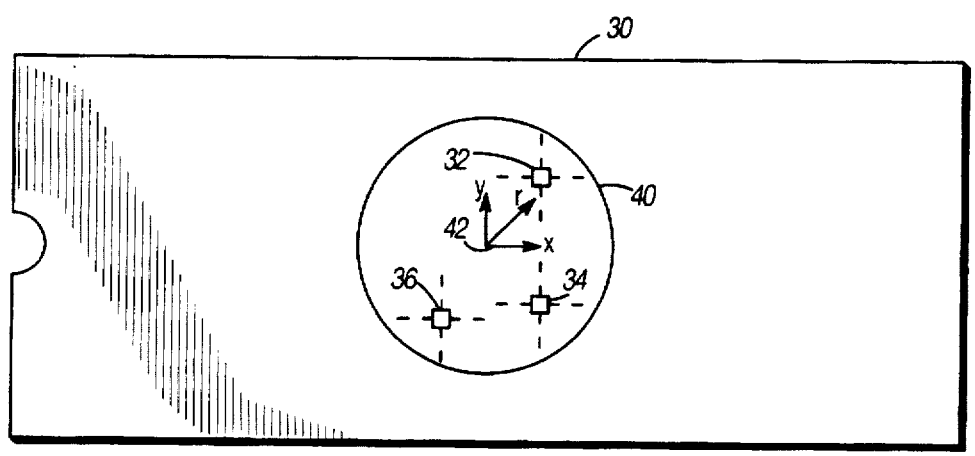
FIG. 3 shows a top view of an integrated circuit implementation of a sensor in accordance with one embodiment of the present invention.

FIG. 3 shows a top view of an integrated circuit implementation of the sensor 14 in accordance with one embodiment of the present invention. Chip body 30 includes a circular array 40 of imaging elements of which example elements 32, 34 and 36 are shown. One must appreciate that circular array 40 can include thousands, millions or more of the imaging elements such as 32, 34 and 36 which, in a preferred embodiment are pixels of a charge-coupled device (CCD) of the kind used in many applications as imaging sensors, particularly in electronic imaging systems. Axis 42 includes rectangular coordinate vectors x and y and polar coordinate vector r about an origin in the center of circular array 40.

In prior art sensors, these imaging elements are distributed uniformly about the surface of the integrated circuit on which they reside. Examples of prior art systems are described in U.S. Pat. No. 4,602,289, issued to Sekine and in "a Device Structure and Spatial Spectrum for Checker-Pattern CCD Color Camera," IEEE Journal of Solid-State Circuits, Vol. SC13, No. 1, February 1978 and are hereby incorporated by reference made thereto. The sensor used in accordance with the present invention differs by providing a nonlinear (nonuniform) distribution of imaging elements.

Figure 4:
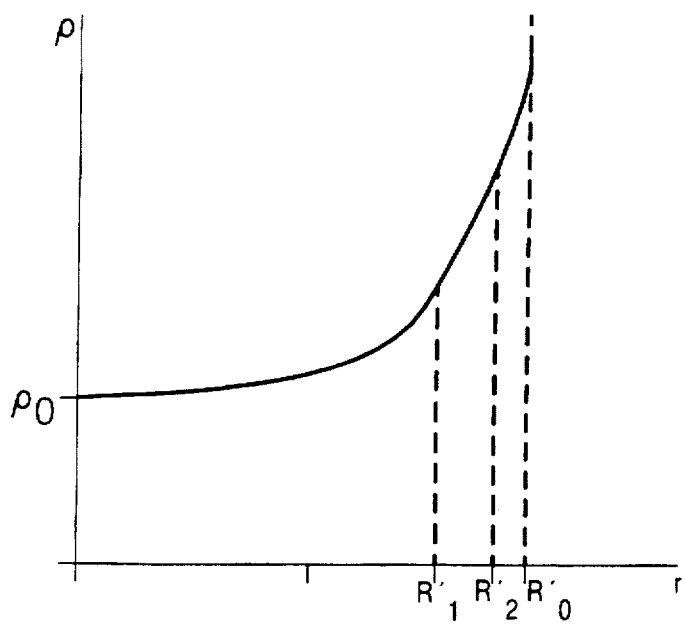
FIG. 4 shows a graph of the density of imaging elements as a function of the radial distance r from the origin in a circular array in accordance with one embodiment of the present invention.

FIG. 4 shows a graph of the density of imaging elements as a function of the radial distance r from the origin in circular array 40 in accordance with one embodiment of the present invention. This density, rho is given by:

$$rho = rho_0 (1-(rT/180R')^2)^{-\frac{1}{2}}$$

where r is a radial distance of a selected imaging element from the center point of the two-dimensional array, $rho_0$ is the density of the distribution of imaging elements, R' corresponds to a maximum radius r of the two-dimensional array and where T is the maximum angle captured by the wide-angle lens (in degrees). $R_1'$ and $R_2'$ represent example values of R' corresponding to different values of T.

If a wide-angle lens is used which captures a full 180 degrees of view, R' would take on the value of $R_0'$. This is an impractical approach because these wide-angle lenses are not readily acquired and implemented. The use of less than a full 180 degrees of view limits the density of elements at the periphery of the sensing array to a finite value.

Figure 5:
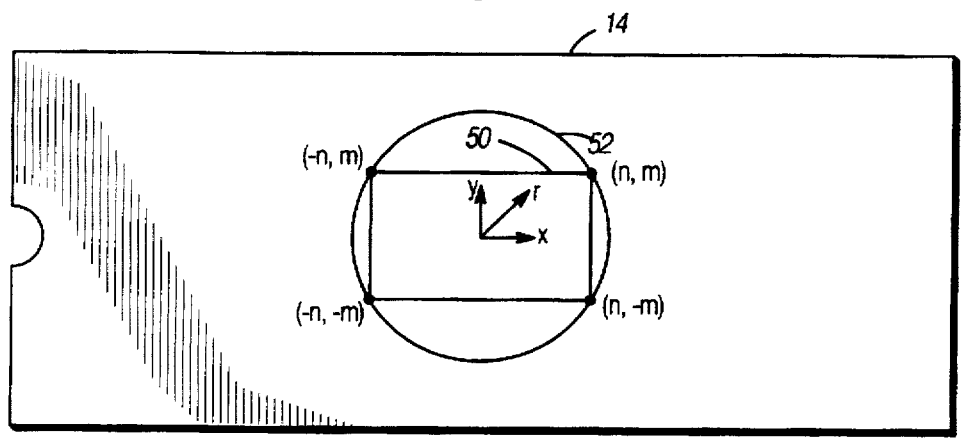
FIG. 5 shows a top view of an integrated circuit implementation of a sensor in accordance with an alternative embodiment of the present invention.

FIG. 5 shows a top view of an integrated circuit implementation of the sensor 14 in accordance with an alternative embodiment of the present invention. In this embodiment, the sensor 14 has a rectangular array 50 which generates a rectangular portion 52 of the image produced by wide-angle lens 12. It should be noted that the density of imaging elements in the rectangular array 50, in one embodiment of the present invention, also conforms the density presented in FIG. 4.

Each of the sensing elements 32, 34, and 36 has a unique two-dimensional address which allows the particular sensing element to be electronically accessed. The address of an arbitrary sensing element can be represented by the coordinate pair (a, b). The physical location of a sensing element having an address (a, b) is given by (x, y) as follows:

$$x = Rsin((Ta/180)(n^2+m^2)^{-\frac{1}{2}}) \quad (1)$$

and $$y = Rsin((Tb/180)(n^2+m^2)^{-\frac{1}{2}}) \quad (2)$$

where (n, m), (−n, m), (n, −m) and (−n, −m) are rectangular coordinates of the physical boundaries of the rectangular sensing array 50.

While the embodiments of the present invention present an addressing system whose origin is the center of the image, one of ordinary skill in the art will recognize that an arbitrary offset can be added to the address components in any dimension without a loss of generality.

Figure 6:
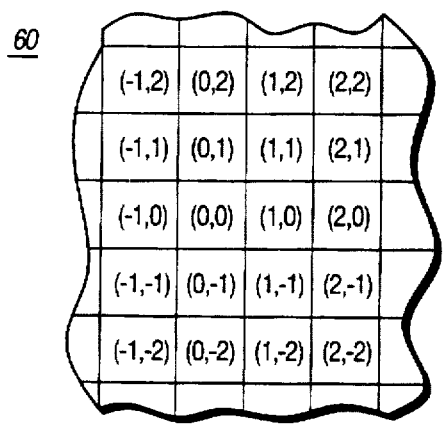
FIG. 6 presents a tabular diagram of the image data produced, by address of the corresponding imaging element, in accordance with one embodiment of the present invention.

FIG. 6 presents a tabular diagram of the image data produced, by address of the corresponding imaging element, in accordance with one embodiment of the present invention. The addresses of the image data 60, derived from the output signal produced by the sensor in this embodiment, are shown. Each of the addresses corresponds to a single pixel of the image to be displayed, wherein the pixel address is the address of the imaging element. Due to the nonlinear distribution of sensing elements and the linear addressing, the sensing element described above provides output image data which is corrected for the distortion introduced by the wide-angle lens without the need of complex mathematical transformation circuitry. Further, the operations of pan and zoom can be performed on this linearly addressed data set in a manner well know to those skilled in the art.

Figure 7:
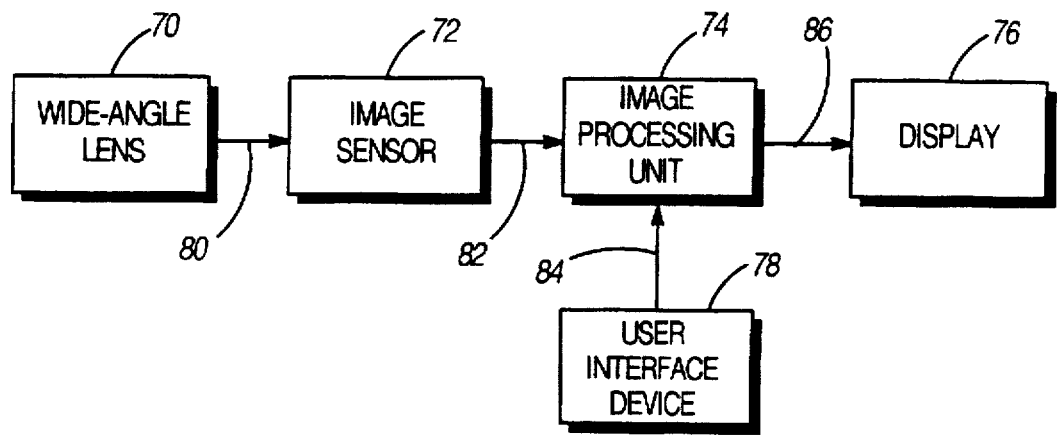
FIG. 7 presents a block diagram of an electronic imaging system in accordance with a further embodiment of the present invention.

FIG. 7 presents a block diagram of an electronic imaging system in accordance with a further embodiment of the present invention. The system includes a wide-angle lens 70 for producing a wide-angle optical image 80, the wide-angle lens producing a distortion in the wide-angle image by the nature of the operation of the wide-angle lens. Imaging sensor 72 has a surface in optical communication with the wide-angle lens. This sensor 72 converts the wide-angle optical image 80 into a corresponding output signal 82. The imaging sensor 72 includes a plurality of imaging elements, the plurality of imaging elements having a distribution on the surface representable by a nonlinear function, wherein the distribution of the imaging elements corrects for the distortion in the wide-angle image 80 and therefore produces an output signal 82 which is distortion-free.

The system further includes an image processing unit 74, responsive to the output signal 82 and a user command signal 84, for selectively magnifying a first region of the wide-angle and for selectively panning from a second region of the wide-angle image to a third region of the wide-angle image. A user interface device 78, coupled to the image processing unit 74 generates the user command signal 84. This user interface device could be responsive to the press of a button, activation of a switch, voice or sound inputs from the user to generate the user command signal 84. This user interface device could further include a communications link such as an optical, infrared, or RF communications link to send these commands to the image processing unit 74.

In an alternative embodiment of the present invention, the image processing unit 74 includes image recognition and tracking capabilities. A particular image could be recognized and its region in the image automatically selected. If the particular image moves, the selected region, in turn, moves to track the position of the particular image.

The system further includes a display device 76, responsive to the output signal 86 of image processing unit 74, for displaying the wide-angle image. In a preferred embodiment of the present invention, this display device is a video monitor which displays captured wide-angle images or a selected region thereof.

Figure 8:
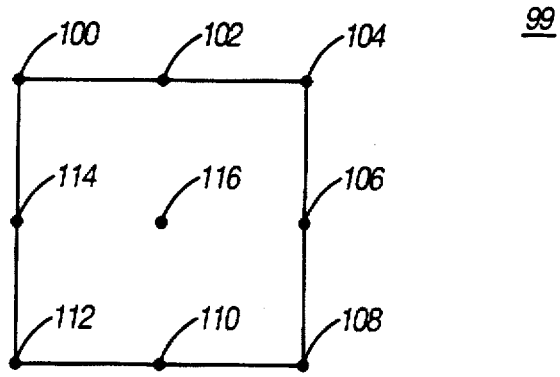
FIG. 8 illustrates a sample image.

FIG. 8 illustrates a sample image. The operation of the various embodiments of the present invention can be described in conjunction with the capturing of this image. Sample image 99 is a square. Points 100, 104, 108, and 112 represent the vertices of the square and points 102, 106, 110, and 114 represent the midpoints of each side. The center of the square is represented by point 116. If a wide angle lens is used to produce a wide-angle optical image the image will be distorted.

Figure 9:
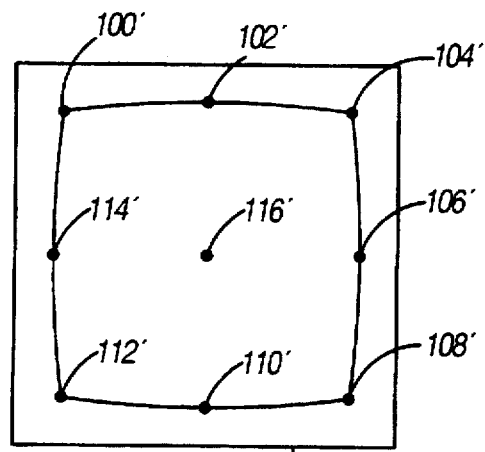
FIG. 9 illustrates an example of a distorted optical image of the sample image produced by a wide-angle lens.

FIG. 9 illustrates an example of a distorted optical image of the sample image produced by a wide-angle lens. In this example, the center of the square 116 is at the center of the field-of-view of the lens. Sample image 122 includes points 100' to 116' which correspond to the distorted position of points 100 to 116 of the sample image. The edges of the square in sample image 99 are noticeably bowed outward due to the distortion produced by the lens. Border 120 represents the extent of the imaging sensor used to convert the wide-angle optical image into a corresponding output signal in accordance with the present invention.

Center 116' of the wide-angle optical image is at the origin of the imaging sensor and thus, will be captured by an imaging element with address (0,0). The points 100', 102', and 104' are no longer colinear in the wide-angle optical image due to the distortion. However, points 100', 102' and 104' will each correspond to a respective imaging element whose address will have a second component which is constant. The addresses of the imaging elements capturing points 100', 102', and 104' can be represented as $(a_1, c_1)$, $(a_2, c_1)$, and $(a_3, c_1)$ respectively. Therefore, the addresses of these imaging elements will be colinear.

Similarly, points 104', 106' and 108' will each correspond to a respective imaging element whose address has a first component which is constant. Thus, the addresses of the imaging elements capturing points 104', 106', and 108' can be represented as $(a_3, c_1)$, $(a_3, c_2)$, and $(a_3, c_3)$ respectively. Therefore, the addresses of these imaging elements will also be colinear. When the imaging elements are accessed using their corresponding addresses and the sample image is reconstructed for display on a standard display device whose pixels are arranged according to these linear addresses, the sample image 99 is displayed without distortion.

While a standard wide-angle lens is used in a preferred embodiment of the present invention. Other wide-angle lens configurations including multi-faceted lenses and multi-segment lenses could likewise be used in accordance with the present invention. In this instance, the particular nonlinear function which describes the distribution of imaging elements on the surface of the sensor would be chosen so as to correct for the distortion induced by these alternative lens configurations.

While a preferred embodiment of the present invention includes a electronic imaging system using one camera and lens, other configurations using multiple cameras and lenses are likewise possible for such applications as the creation of an aggregate image or the creation of a stereoscopic image with depth.

It should be obvious to one of ordinary skill in the art that many of the elements used in the various embodiments of the present invention are well suited for implementation on a processor such as a microprocessor, a digital signal processor or a micro controller. Likewise these elements could be performed in hardware by a custom integrated circuit, ASIC, programmable logic array or similar devices.

While specific embodiments of the present invention have been shown and described, it will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. An electronic imaging system for capturing an image, the system comprising;

a lens for producing a optical image; and an imaging sensor, having a surface in optical communication with the lens, for converting the optical image into a corresponding output signal, the imaging sensor comprising a plurality of imaging elements, the plurality of imaging elements having a distribution on the surface representable by a nonlinear function;

wherein the distribution of imaging elements has a relatively low density at a center point of the surface and a relatively high density at a point along a periphery of the surface and wherein each of the plurality of imaging elements is addressable by a two-dimensional address.

2. The system of claim 1 wherein each of the plurality of imaging elements includes a pixel of a charge-coupled device.

3. The system of claim 1 wherein the plurality of imaging elements are in a two-dimensional array.

4. The system of claim 1 wherein the nonlinear function can be represented by:

$$rho = rho_0 (1-(rT/180R')^2)^{-\frac{1}{2}}$$

where r is a radial distance of a selected imaging element from the center point of the two-dimensional array, $rho_0$ is the density of the distribution of imaging elements, R' corresponds to a maximum radius r of the two-dimensional array and where T is the maximum angle captured by the wide-angle lens (in degrees).

5. The system of claim 1 wherein the output signal is a video signal.

6. The system of claim 1 wherein the output signal includes a plurality of image data.

7. The system of claim 1 further comprising a display, responsive to the output signal, for displaying the image.

8. The system of claim 1 further comprising a image processing unit, responsive to the output signal and a user command signal, for selectively magnifying a first region of the image.

9. The system of claim 8 further comprising a image processing unit, responsive to the output signal and a user command signal, for selectively panning from a second region of the image to a third region of the image.

10. The system of claim 8 further comprising a user interface device, coupled to the image processing unit, for generating the user command signal.

11. A sensor for use in an electronic imaging system having a lens that produces a optical image, the sensor comprising;

a surface in optical communication with the lens; and a plurality of imaging elements, coupled to the surface, for converting the optical image into a corresponding output signal, the plurality of imaging elements having a distribution on the surface representable by a nonlinear function;

wherein the distribution of imaging elements has a relatively low density at a center point of the surface and a relatively high density at a point along a periphery of the surface and each of the plurality of imaging elements is electronically addressable by a two-dimensional address.

12. The sensor of claim 11 wherein each of the plurality of imaging elements includes a pixel of a charge-coupled device.

13. The sensor of claim 11 wherein the plurality of imaging elements are in a two-dimensional array.

14. The sensor of claim 11 wherein the nonlinear function can be represented by:

$$rho = rho_0 (1-(rT/180R')^2)^{-\frac{1}{2}}$$

where r is a radial distance of a selected imaging element from the center point of the two-dimensional array, $rho_0$ is the density of the distribution of imaging elements, R' corresponds to a maximum radius r of the two-dimensional array and where T is the maximum angle captured by the lens (in degrees).

15. The sensor of claim 11 wherein the output signal is a video signal.

16. The sensor of claim 11 wherein the output signal includes a plurality of image data.

17. The system of claim 1 wherein the lens includes a wide-angle lens.

18. The sensor of claim 11 wherein the lens includes a wide-angle lens.

19. An image sensor comprising:
- a first set of imaging elements within a first region of a surface of the sensor, the first region including a center point of the surface of the sensor, the first set of imaging elements having a first distribution density; and
- a second set of imaging elements within a second region of the surface of the sensor, the second region not including the center point of the surface of the sensor, the second set of imaging elements having a second distribution density, the second distribution density exceeding the first distribution density, each of the imaging elements in the first and second set of imaging elements addressable by two-dimensional coordinates.

20. The image sensor of claim 19, wherein the second region includes a peripheral point of the surface of the image sensor.

21. The image sensor of claim 19, wherein each of the imaging elements includes a pixel of a charge-coupled device.

22. The image sensor of claim 19, wherein the imaging elements are electronically addressed by the two-dimensional coordinates and the coordinates are rectangular coordinates.

23. An image sensor comprising:
- a plurality of imaging elements arranged in a rectangular two-dimensional array, the plurality of imaging elements including:
  - a first set of imaging elements within a first region of a surface of the sensor, the first region including a center point of the surface of the sensor having a first distribution density; and
  - a second set of imaging elements within a second region of the surface of the sensor, the second region not including the center point of the surface of the sensor, the second set of imaging elements having a second distribution density, the second distribution density exceeding the first distribution density.

* * * * *